United States Patent
Dong et al.

(10) Patent No.: US 12,153,565 B1
(45) Date of Patent: Nov. 26, 2024

(54) AUTOMATIC DISPATCH OF MULTIPLE TABLES INTO CONSISTENCY GROUPS WITHIN AN ACTIVE-ACTIVE SOLUTION

(71) Applicant: International Business Machines Corporation, Armonk, NY (US)

(72) Inventors: Xin Xin Dong, Beijing (CN); Mai Zeng, Shi Jing Shan (CN); Xing Jun Zhou, Shanghai (CN); Ming Qiao Shang Guan, Beijing (CN); Wei Song, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/466,967

(22) Filed: Sep. 14, 2023

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
CPC .......... G06F 16/2365; G06F 16/2379
USPC .......................................................... 707/690
See application file for complete search history.

(56) References Cited

U.S. PATENT DOCUMENTS

| | | | |
|---|---|---|---|
| 9,025,602 B2 | 5/2015 | Zhong et al. | |
| 9,514,180 B1 * | 12/2016 | Cadarette | G06F 16/2358 |
| 10,025,843 B1 | 7/2018 | Meiri et al. | |
| 11,157,518 B2 * | 10/2021 | Bourbonnais | G06F 16/278 |
| 2005/0138087 A1 * | 6/2005 | Beck | G06F 11/1469 |
| 2008/0052378 A1 * | 2/2008 | Matsuyama | H04L 41/22 709/218 |
| 2012/0023369 A1 * | 1/2012 | Bourbonnais | G06F 16/2386 714/E11.131 |
| 2012/0030245 A1 * | 2/2012 | Herrnstadt | G06F 16/283 707/E17.037 |
| 2013/0339290 A1 * | 12/2013 | Lee | G06F 17/10 706/55 |
| 2014/0075411 A1 * | 3/2014 | Diep | G06F 8/34 717/109 |
| 2014/0279892 A1 * | 9/2014 | Bourbonnais | G06F 16/278 707/633 |
| 2018/0203913 A1 | 7/2018 | Bourbonnais et al. | |
| 2020/0019631 A1 | 1/2020 | Fan et al. | |
| 2020/0349128 A1 * | 11/2020 | Portisch | G06F 16/212 |
| 2021/0125127 A1 * | 4/2021 | Li | G06Q 10/04 |
| 2023/0004889 A1 * | 1/2023 | Epstein | G06Q 10/0635 |
| 2023/0040635 A1 * | 2/2023 | Narayan | G06F 16/90335 |

(Continued)

FOREIGN PATENT DOCUMENTS

| | | | | |
|---|---|---|---|---|
| CN | 115080236 A | * | 9/2022 | ......... G06F 16/9024 |
| CN | 115622041 A | * | 1/2023 | |

*Primary Examiner* — Phuong Thao Cao
(74) *Attorney, Agent, or Firm* — Cantor Colburn LLP; Kelsey M. Skodje

(57) ABSTRACT

In computer methods and systems for operating a database management system using a catalog table collection module each table in the database management system is cataloged. Multiple tables are automatically dispatched into multiple consistency groups by collecting real-time statistics using a real time statistics module. Workload profile data of the database management system is generated using a workload profile collection module, and an optimized multiple consistency group definition for the database management system is generated using a transaction splitting analysis module.

11 Claims, 8 Drawing Sheets

(56) References Cited

U.S. PATENT DOCUMENTS

2023/0054003 A1\* 2/2023 Shao ................ H04L 67/12
2023/0142885 A1\* 5/2023 Laszlo ............... G06N 3/006
　　　　　　　　　　　　　　　　　706/15

\* cited by examiner

AUTOMATIC DISPATCH OF MULTIPLE TABLES INTO CONSISTENCY GROUPS WITHIN AN ACTIVE-ACTIVE SOLUTION

BACKGROUND

The present invention generally relates to software data replication tools, and more specifically, to a system that automatically dispatches multiple tables into constancy groups within an active-active solution.

Multi-user computer systems, such as mainframes with active-active user bases, frequently have multiple users simultaneous performing computational operations that required data transfer and replication between databases. In order to maintain consistency between all the simultaneous users, the operations are broken into consistency groups by the database management systems.

SUMMARY

Embodiments of the present invention are directed to a computer-implemented method for A non-limiting example of the computer-implemented method includes using a catalog table collection module each table in the database management system is cataloged. Multiple tables are automatically dispatched into multiple consistency groups by collecting real-time statistics using a real time statistics module. Workload profile data of the database management system is generated using a workload profile collection module, and an optimized multiple consistency group definition for the database management system is generated using a transaction splitting analysis module. Embodiments of the present invention are directed to a system and to a computer program product for performing the same, the computer program product comprising a computer readable storage medium having program instructions embodied therewith. The program instructions are executable by a processor to cause the processor to perform a method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
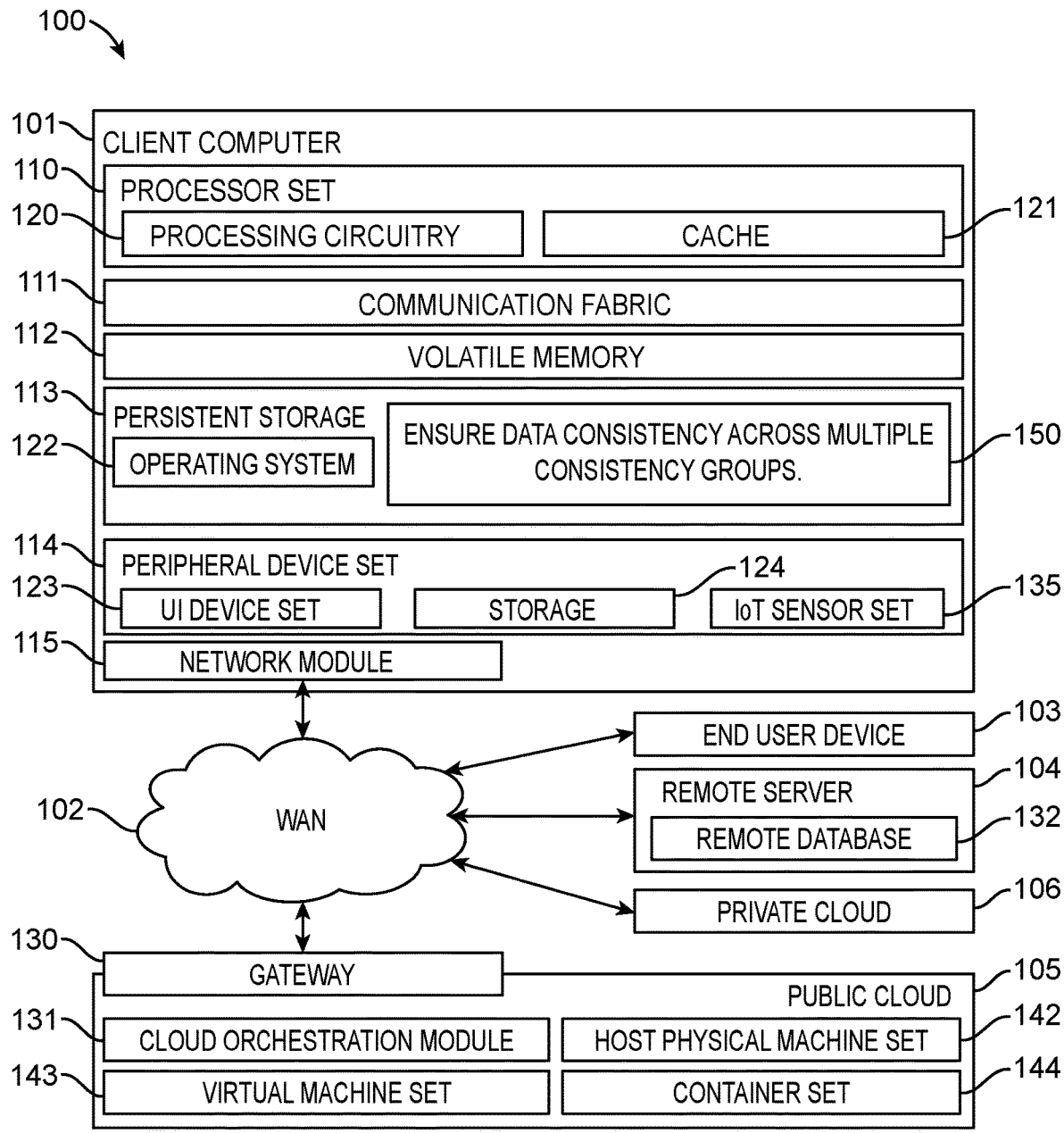
FIG. 1 depicts one exemplary cloud computing system configured to implement the system and method according to one embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having." "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Computing environment 100 contains an example of an environment for the execution of at least some of the computer code involved in performing the inventive methods, such as ensuring data consistency across multiple consistency groups at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 132, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 132, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, mainframe Active-Active (A-A) users require a substantial number of user application tables. All of the application tables run different workloads with various amount of insert/update/delete operations (or other similar data replication or manipulation operations). Users using data replication operations typically utilize a software data replication tool to ensure the data consistency which has multiple consistency groups to provide scalability and parallel replication ability.

Figure 2:
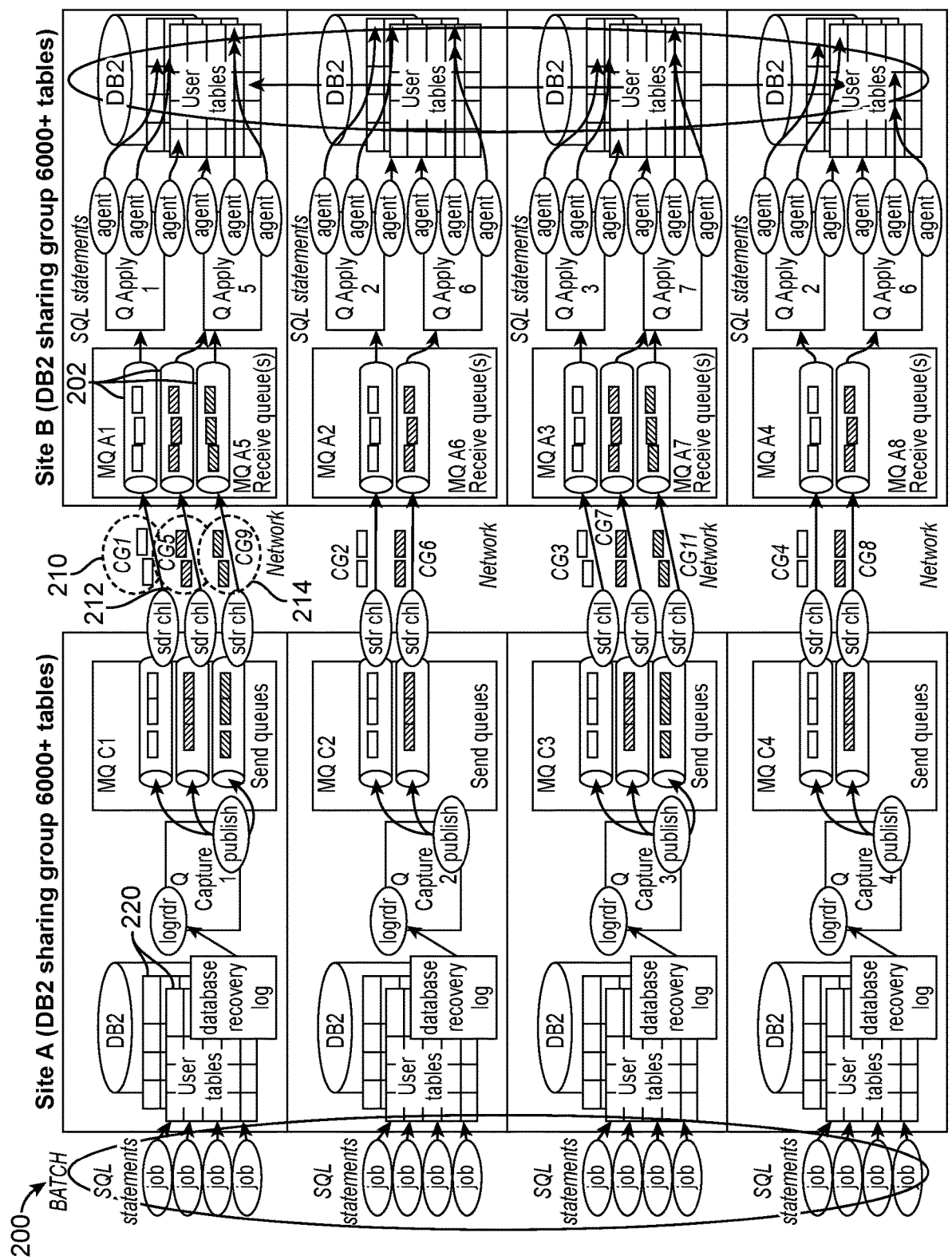
FIG. 2 depicts a computer system including multiple active-active users running data replication operations.

In the example of FIG. 2, one CG 210, 212, 214 includes all the tables 220 that are replicated on a single receive queue 202 and each table 220 is assigned to one and only one CG 210, 212, 214. Assuming a customer has a large number of tables, the system 200 is faced with the task of how to optimally split the tables into different CG's 210, 212, 214. When multiple CG's 210, 212, 214 replicate excessive amounts of data and exceed their capacity, the total consistency of the data can be negatively impacted.

To prevent the negative impact, the system 200 is required to ensure all the tables maintain a balanced status, so all the consistency groups can replicate data with a similar pace. The system of FIGS. 1 and 2 provides a method to automatically, and optimally, dispatch many tables into different consistency groups in active-active (A-A) solutions, thereby ensuring data consistency across multiple consistency groups.

Figure 3:
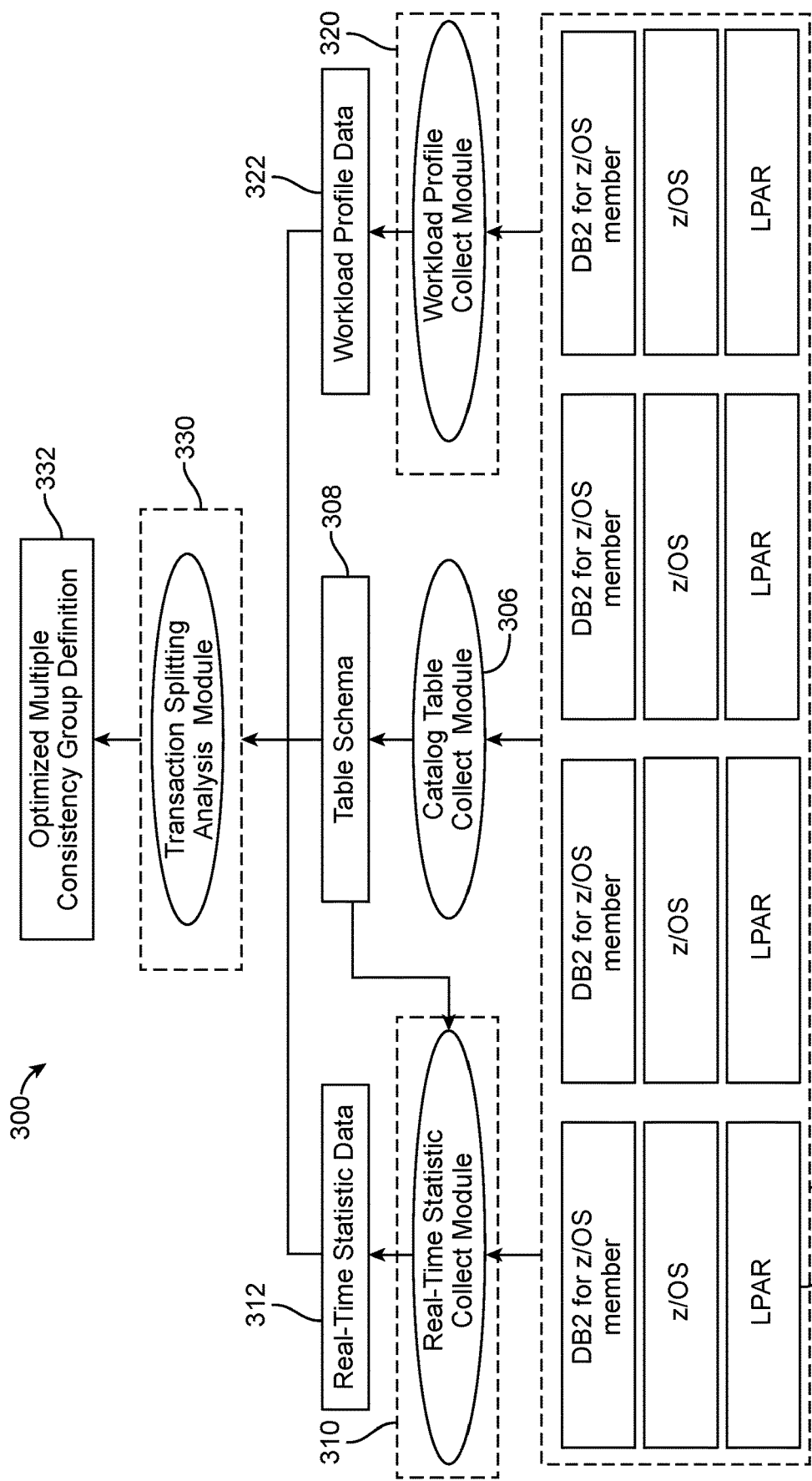
FIG. 3 depicts an exemplary architecture for identify constancy groups for the tables within the computer system of FIG. 2.
Figure 4:
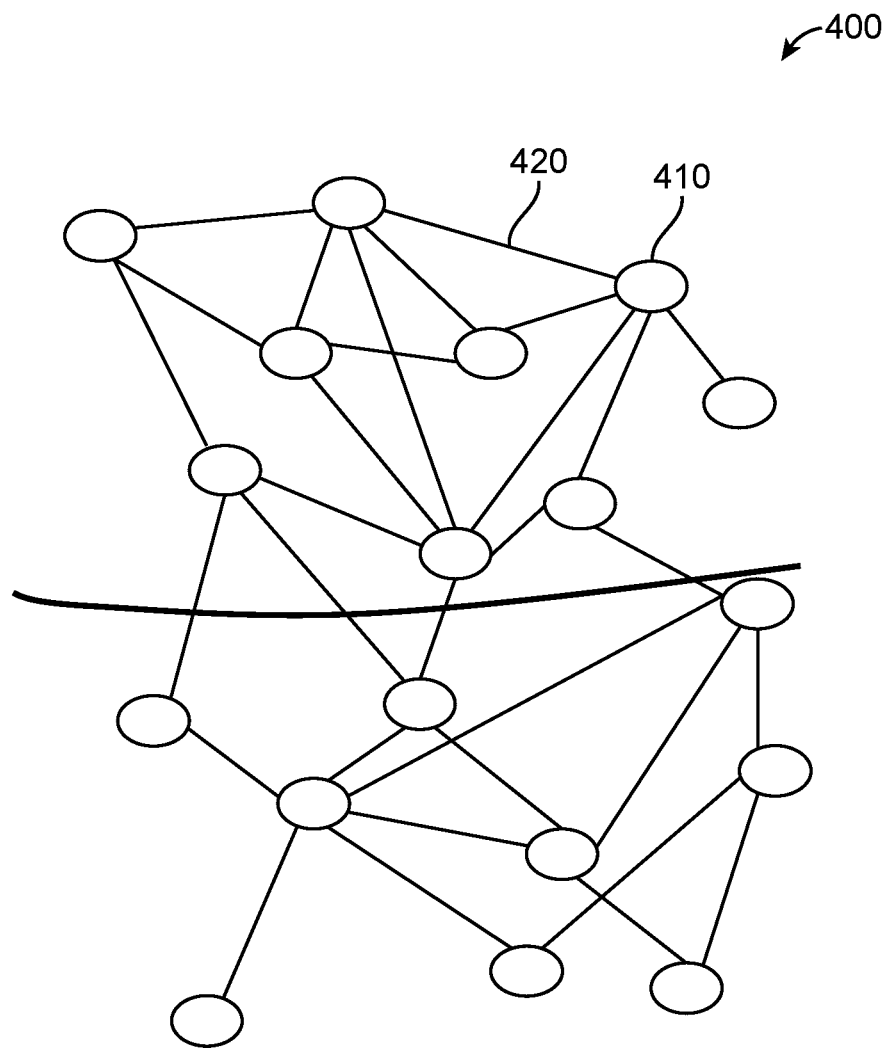
FIG. 4 depicts an exemplary graph node chart.
Figure 5:
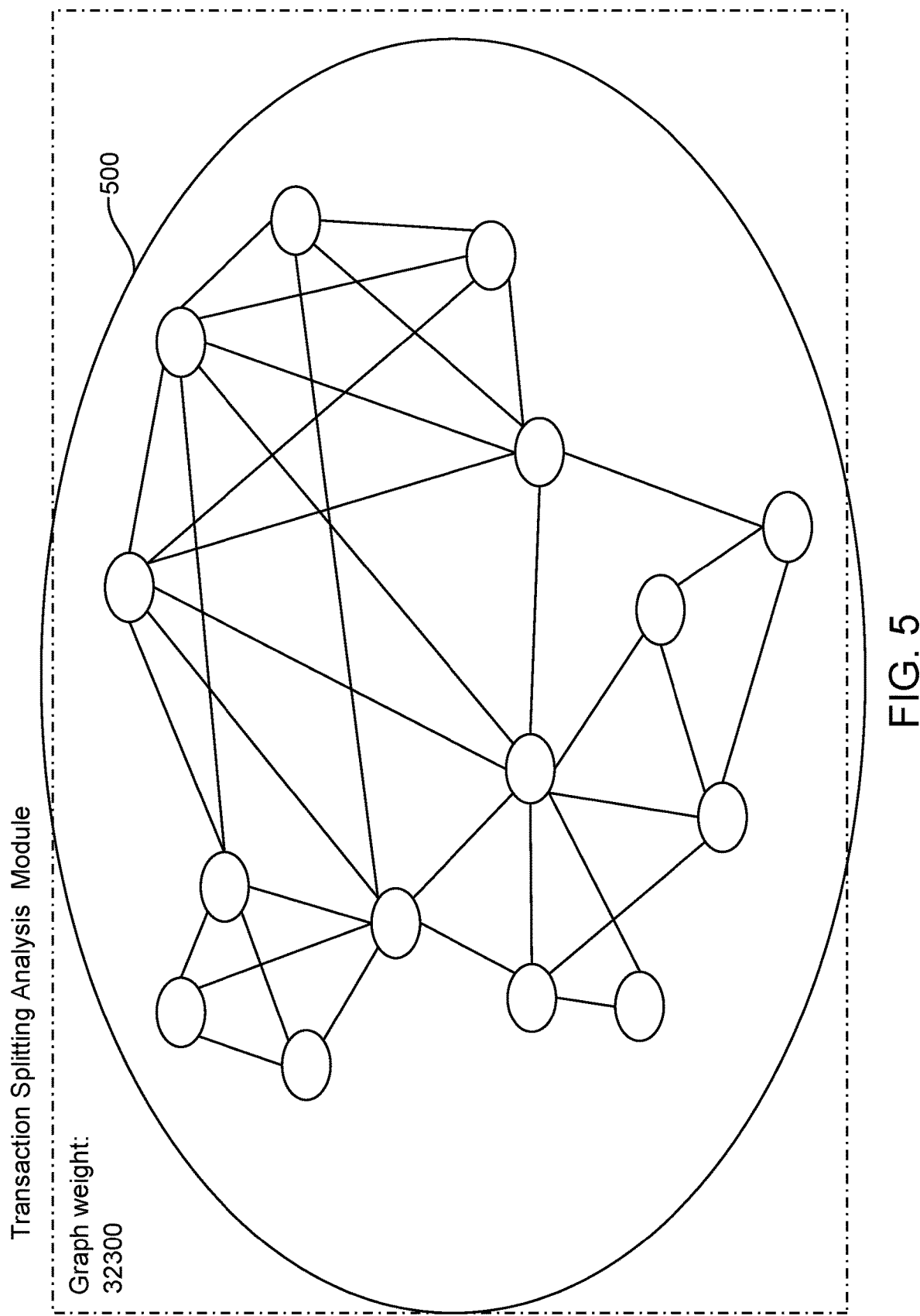
FIG. 5 depicts node graph of tables included in the computer system.

Turning now to an overview of the aspects of the invention, one or more embodiments of the invention address the above-described shortcomings of the prior art using the architecture illustrated in FIG. 3. The architecture 300 includes a database management system 302, with multiple tables 304. A catalog table collect module 306 catalogs the tables 304 using any known cataloguing process and generates a table schema 308. A real-time statistic collection module (RTS module 310) generates real time statistic data 312 including an average workload rate and peak workload rate for each table 304 and monitors and collects real-time statistics about the tables 304. A workload profiling collection module (WPC module 320) collects the workload running snapshot list including the transaction pattern after decoding DBMS 302 logs and generates a workload profile data 322 output. In some examples, the workload profile data 322 output may be snapshots of transaction patters for every time interval.

The real-time statistics data 312, table schema 308, and workload profile data 314 are provided to a transaction splitting analysis module 330 to calculate a distribution relationship between the tables 304 and groups and to minimize splitting the tables of a single transaction into different consistency groups using a Girvan-Newman (GN) algorithm. The graph node algorithm generates an optimized multiple consistency group definition that is used to organize and maintain consistency across all the consistency groups, and the algorithm illustrated in FIGS. 5-8.

The real-time statistic data is a portion of an input for, and is provided to, a transaction splitting analysis module. Workload profile data is going to be a part of input of a transaction splitting analysis module.

real-time statistics collect module 310 includes software configured to collect the real-time statistic from database management systems (DBMS 302) running time, and includes specifying a concrete sampling start and end timestamp, combining the table schema 308 from catalog tables 306 and collecting the real-time statistics of each table 304 from DBMS 302, and generating an average workload rate and peak workload rate for each table 304. This information is collected as the real time statistic data 312 and is provided to the transaction splitting analysis module 330. The optimized constancy groups are output from the transaction splitting analysis module as an optimized multiple consistency group definition 332 and the consistency groups are utilized in the standard operations of the computer system(s).

The workload profile collect module 320 is responsible to collect the workload running snapshot list and includes functions to read a DBMS 302 active/archive log for every requested time window and decode the log records. Identified transactions are clustered based on their accessed/updated tables and each cluster is a pattern. For each transaction pattern, the total transaction counts is recorded, the total insert/update/delete count for each table is recorded and the total insert/update/delete replication-based message size in bytes is recorded for each table. Then a snapshot is generated, with the snapshot including all the pattern statistics per sampling interval. The sampling interval is determined in one example based on database log timestamps.

The above-described aspects of the invention address the shortcomings of the prior art by using the transaction splitting analysis module 330 to apply a graph node algorithm to optimize the placement of tables within consistency groups.

Turning now to a more detailed description of aspects of the present invention, and with continued reference to FIGS. 1-3, FIG. 4 depicts a graph node chart 400 as utilized by the transaction splitting analysis module 330 of FIG. 3. The graph node chart 400 includes multiple nodes 410, with each node 410 representing one of the tables 304. The weight of any given node 410 is the time series insert/update/delete (IUD) statistics generated by the RTS module 310. Each edge 420 connecting two nodes indicates that there exists one or more transaction patterns that correlates both tables (nodes 410). The weight of the total transaction instance counts from all related patterns.

With continued reference to FIGS. 1-4, FIGS. 5-8 illustrate a process of operations of the transaction splitting analysis module 330 on an exemplary graph. It is appreciated that the exemplary graph is simplified for explanatory purposes, and the quantities and relative positions of nodes 510 are non-limiting and are purely for explanation.

The specific operations of the transaction splitting analysis module 330 include splitting the graph (e.g., graph 400) based on a graph node algorithm. The graph node algorithm initially sums a total graph weight (e.g. 32300) with their nodes weight for each graph (See Graph 500, FIG. 5).

Figure 6:
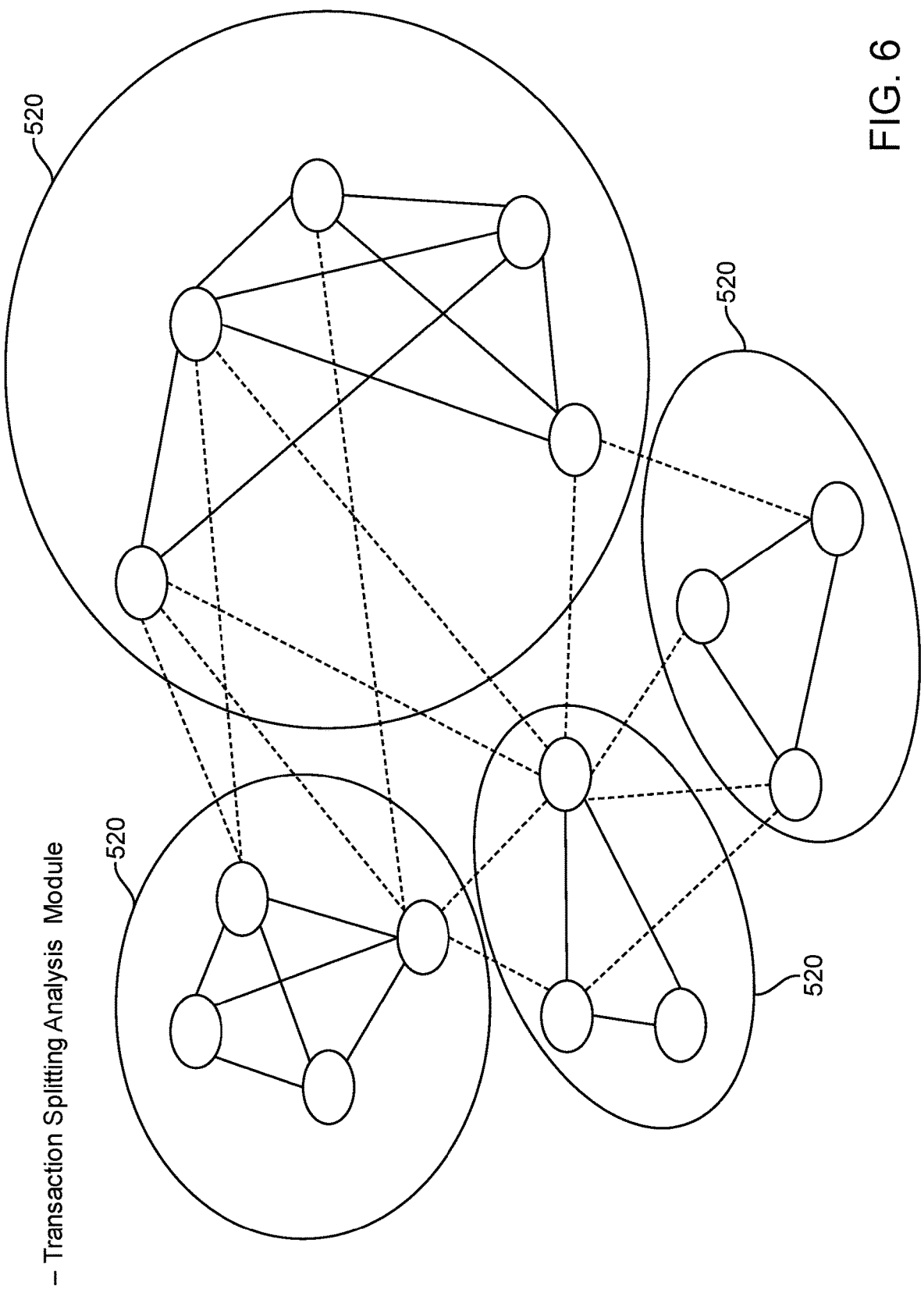
FIG. 6 depicts an initial partitioning of the nodes into sub-graphs.

Then the algorithm computes each edge's betweenness centrality "g" according to:

$$g(v) = \sum_{s \neq v \neq t} \frac{\sigma_{st}(v)}{\sigma_{st}}$$

Where $\sigma_{st}(v)$ is a number of the shortest paths from vertex "s" to vertex "t" through edge $v$, and $\sigma_{st}$ is a total number of the shortest paths from vertex s to vertex t. Then the algorithm sorts edges according to their betweenness centrality value/edges weight and cuts some edges with higher betweenness centrality and/or edges weight to split the graph into multi sub-graphs 510 as shown in FIG. 6. The algorithm repeats cutting edges with a higher betweenness centrality/edges weight to split the graph into multi sub-graphs, until the number of sub-graphs 520 is from 2 to 3 times of the total number of consistency groups.

Figure 7:
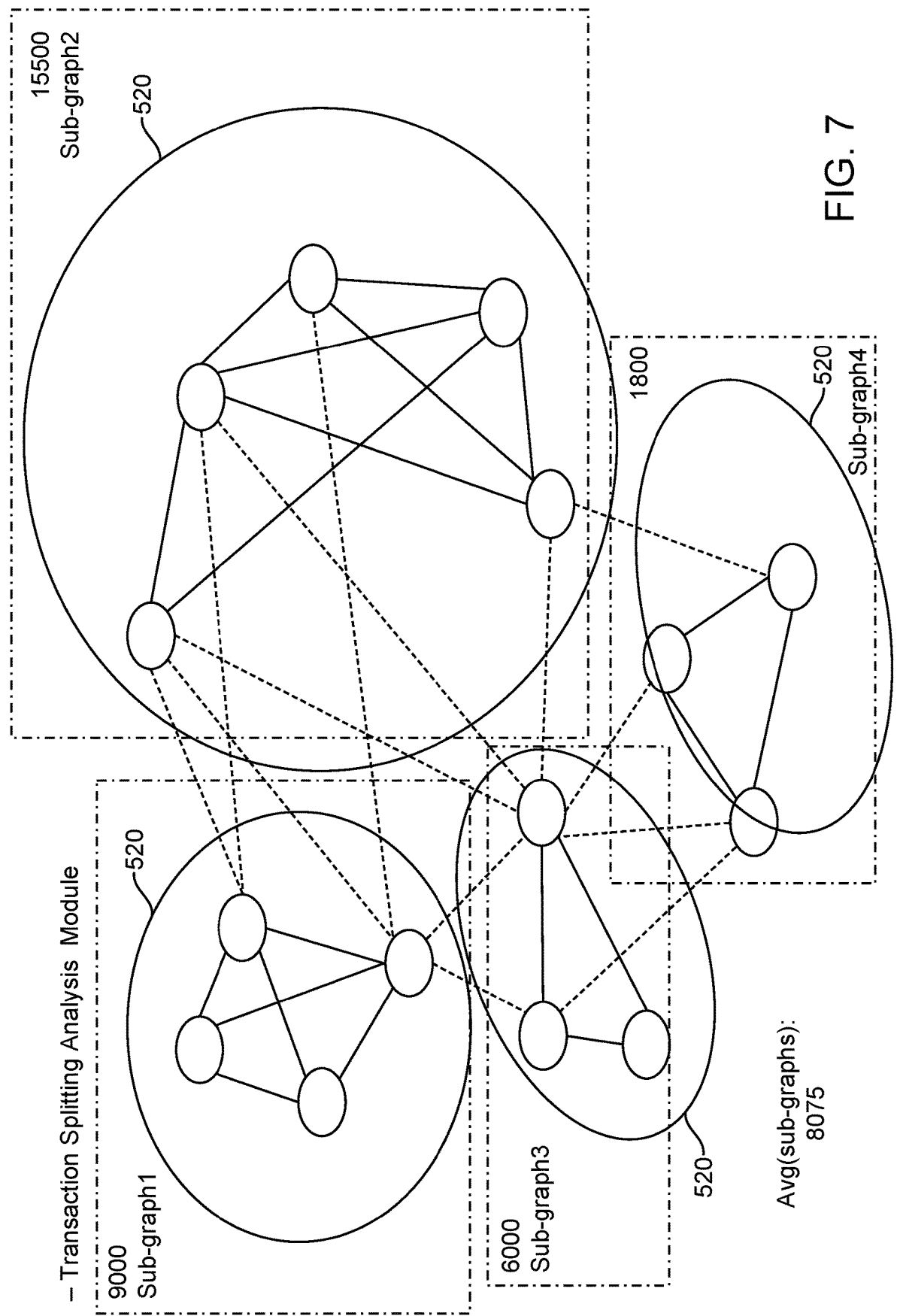
FIG. 7 depicts an evaluation of the initial partitioning of the sub-graphs.

The algorithm then sums the weight for every sub-graph 520 and computes the average weight for the sub-graphs 520. The algorithm evaluates whether the weight of each sub-graph 520 is greater than one half the average weight of all the sub-graphs 520 and less then 3 half's of the average weight of the sub-graphs 520. When the condition is not met (e.g. when at least one of the sub-graphs 520 has a weight that is less than half to average weight or more than 3 half's the average weight, the sub-graphs 520 are re-sorted by either one or both of splitting overweight sub-graphs 520 (sub-graphs 520 with a weight greater than 3 half's the average weight) to ensure that the weight of each sub-graph is less than 3 half's the average weight and combine under sized sub-graphs 520 (e.g. sub-graphs with a weight less than half the average sub-graph weight) according to betweenness centrality value/edges weight among sub-graphs 520 to ensure that the formerly undersized sub-graphs 520 each have a weight greater than one half the average weight. The newly formed sub-graphs 520 are rechecked according to the same weight criteria, as shown in FIG. 7.

Figure 8:
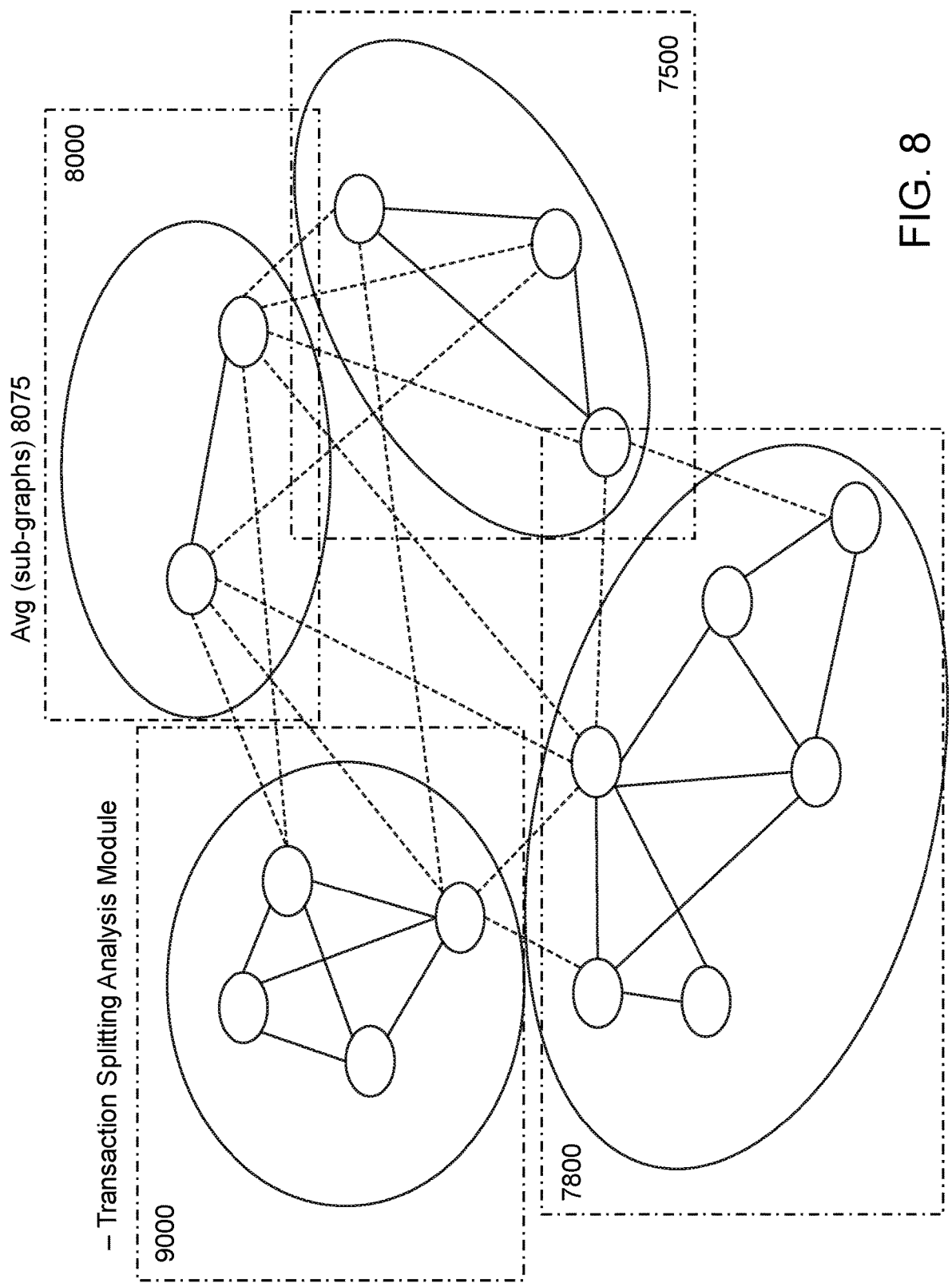
FIG. 8 depicts a balanced partitioning of the sub-graphs at a conclusion of the process.

The above process is re-iterated until all the sub-graphs 520 meet the criteria, as in FIG. 8. Once the criteria is met, the nodes within each sub-graph 520 are grouped as a corresponding consistency group, and each sub-graph 520 constitutes a consistency group. The optimized consistency group are then output to the computing system as shown in FIG. 3.

In some examples, the above system can be further enhanced by running the entire operation multiple times for different solutions in order to identify the minimum number of consistency groups that can meet the criteria.

By implementing the above processes within a computer system, the computer system can automatically dispatch many tables into different consistency groups in an active-active solution. This enhances the replication workload balance in the whole replication procedure from the log read, message queue transmission to transaction replay, and can minimize the impact of the transaction atomicity during replication.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
cataloging each table in a database management system using a catalog table collection module;
automatically dispatching a plurality of tables into a plurality of consistency groups by collecting real-time statistics using a real time statistics module;
generating workload profile data of the database management system using a workload profile collection module; and
generating an optimized multiple consistency group definition for the database management system using a transaction splitting analysis module having the generated workload profile data as an input, wherein using a transaction splitting analysis module comprises balancing a plurality of consistency groups using a graph node algorithm defining a plurality of nodes and a plurality of edges, with each node representing a table in the database management system, and each edge connects two tables including at least one transaction pattern correlating between the two tables, wherein the graph node algorithm is configured to assign a weight to each node;
wherein the graph node algorithm sorts edges according to their betweenness centrality value/edges weight and cuts some edges with higher betweenness centrality and/or edges weight to define multiple sub-graphs, with each consistency group of the optimized multiple consistency groups being a set of nodes of a corresponding sub-graph of the multiple sub-graphs; and
wherein the graph node algorithm further sums a weight of every sub-graph and computes an average weight for the sub-graphs, evaluating whether all sub-graphs meet a condition of the weight of each sub-graph is greater than one half of the average weight of all the sub-graphs and less than three half's of the average weight of the sub-graphs, and responding to at least one sub-graph failing the condition by at least one of splitting sub-graphs with a weight greater three than half's of the average weight to ensure that the weight of each sub-graph is less than three half's of the average weight and combining sub-graphs with a weight less than half of the average sub-graph weight according to betweenness centrality value/edges weight among sub-graphs to ensure that the sub-graphs each have a weight greater than one half of the average weight.

2. The computer-implemented method of claim 1, wherein the catalog table collection module identifies each table in the database management system and outputs a listing of each table in the database management system as a table schema.

3. The computer-implemented method of claim 2, wherein the real-time statistics module receives the table schema, and generates real time statistic data including an average workload rate and a peak workload rate for each table in the database management system and monitors and collects the real-time statistics data, determines a time series insert/update/delete (IUD) statistic for each table, and outputs the collected real time statistics data to the transaction splitting analysis module.

4. The computer-implemented method of claim 1, wherein generating the workload profile data of the database management system comprises identifying a transaction pattern of logs of the database management system and generating a workload profile data output, the workload profile data output includes a workload running snapshot list.

5. The computer implemented method of claim 1, wherein the weight of each node is a time series insert/update/delete (IUD) statistics generated by the real time statistics module, and wherein the graph node algorithm computes each edge's betweenness centrality "g" according to:

$$g(v) = \sum_{s \neq v \neq t} \frac{\sigma_{st}(v)}{\sigma_{st}}$$

where $\sigma_{st}(v)$ is a number of shortest paths from node to node through edge v, and $\sigma_{st}$ is a total number of the shortest paths from node to node.

6. The computer-implemented method of claim 5, wherein the graph node algorithm repeats cutting edges with a higher betweenness centrality/edges weight until a total quantity of sub-graphs is in the range of 2 to 3 times a total number of consistency groups.

7. A computer program product comprising a non-transitory computer readable medium storing instructions for causing a computer system to perform a method comprising:
cataloging each table in a database management system using a catalog table collection module;
automatically dispatching a plurality of tables into a plurality of consistency groups by collecting real-time statistics using a real time statistics module;
generating workload profile data of the database management system using a workload profile collection module; and
generating an optimized multiple consistency group definition for the database management system using a transaction splitting analysis module having the generated workload profile data as an input, wherein the transaction splitting analysis module balances a plurality of consistency groups using a graph node algorithm, the graph node algorithm defining a plurality of nodes and a plurality of edges, with each node representing a table in the database management system, and each edge connects two tables including at least one transaction pattern correlating between the two tables, wherein the graph node algorithm assigns a weight to each node, and wherein the weight of each node is a time series insert/update/delete (IUD) statistics generated by the real time statistics module, and wherein the graph node algorithm computes each edge's betweenness centrality "g" according to:

$$g(v) = \sum_{s \neq v \neq t} \frac{\sigma_{st}(v)}{\sigma_{st}}$$

where $\sigma_{st}(v)$ is a number of shortest paths from node to node through edge v, and $\sigma_{st}$ is a total number of the shortest paths from node to node;
the graph node algorithm sorting edges according to their betweenness centrality value/edges weight and cuts some edges with higher betweenness centrality and/or edges weight to define multi sub-graphs and repeats cutting edges with a higher betweenness centrality/edges weight until a total quantity of sub-graphs is in the range of 2 to 3 times a total number of consistency groups, with each consistency group of the optimized multiple consistency groups being a set of nodes of a corresponding sub-graph of the multiple sub-graphs; and
further comprising summing a weight of every sub-graph and computing an average weight for the sub-graphs, evaluating whether all sub-graphs meet a condition of the weight of each sub-graph is greater than one half of the average weight of all the sub-graphs and less than three half's of the average weight of the sub-graphs, and responding to at least one sub-graph failing the condition by at least one of splitting sub-graphs with a weight greater three than half's of the average weight to ensure that the weight of each sub-graph is less than three half's of the average weight and combining sub-graphs with a weight less than half of the average sub-graph weight according to betweenness centrality value/edges weight among sub-graphs to ensure that the sub-graphs each have a weight greater than one half of the average weight.

8. The computer program product of claim 7, wherein the catalog table collection module identifies each table in the database management system and outputs a listing of each table in the database management system as a table schema.

9. The computer program product of claim 8, wherein the real-time statistics module receives the table schema, and generates real time statistic data including an average workload rate and a peak workload rate for each table in the database management system and monitors and collects real-time statistics data, determines a time series insert/update/delete (IUD) statistic for each table, and outputs the collected real time statistics data to the transaction splitting analysis module.

10. The computer program product of claim 7, wherein generating the workload profile data of the database management system comprises identifying a transaction pattern of logs of the database management system and generating a workload profile data output, the workload profile data output includes a workload running snapshot list.

11. A computer system comprising:
a mainframe configured to operate with an active-active user base, wherein each user is able to perform computations configured to replicate data;
a database management system configured to define a plurality of tables, with each table corresponding to a user and including computations performed by the user; and
wherein the mainframe is further configured to implement a method comprising:
cataloging each table in a database management system using a catalog table collection module;
automatically dispatching a plurality of tables into a plurality of consistency groups by collecting real-time statistics using a real time statistics module;
generating workload profile data of the database management system using a workload profile collection module; and
generating an optimized multiple consistency group definition for the database management system using a transaction splitting analysis module having the generated workload profile data as an input, wherein the transaction splitting analysis module balances a plurality of consistency groups using a graph node algorithm, the graph node algorithm defining a plurality of nodes and a plurality of edges, with each node representing a table in the database management system, and each edge connects two tables including at least one transaction pattern correlating between the two tables, wherein the graph node algorithm assigns a weight to each node, and wherein the weight of each node is a time series insert/update/delete (IUD) statistics generated by the real time statistics module, and wherein the graph node algorithm computes each edge's betweenness centrality "g" according to:

$$g(v) = \sum_{s \neq v \neq t} \frac{\sigma_{st}(v)}{\sigma_{st}}$$

where $\sigma_{st}(v)$ is a number of shortest paths from node to node through edge v, and $\sigma_{st}$ is a total number of the shortest paths from node to node;
the graph node algorithm sorting edges according to their betweenness centrality value/edges weight and cuts some edges with higher betweenness centrality and/or edges weight to define multi sub-graphs and repeats cutting edges with a higher betweenness centrality/ edges weight until a total quantity of sub-graphs is in the range of 2 to 3 times a total number of consistency groups, with each consistency group of the optimized multiple consistency groups being a set of nodes of a corresponding sub-graph of the multiple sub-graphs; and
further comprising summing a weight of every sub-graph and computing an average weight for the sub-graphs, evaluating whether all sub-graphs meet a condition of the weight of each sub-graph is greater than one half of the average weight of all the sub-graphs and less than three half's of the average weight of the sub-graphs, and responding to at least one sub-graph failing the condition by at least one of splitting sub-graphs with a weight greater three than half's of the average weight to ensure that the weight of each sub-graph is less than three half's of the average weight and combining sub-graphs with a weight less than half of the average sub-graph weight according to betweenness centrality value/edges weight among sub-graphs to ensure that the sub-graphs each have a weight greater than one half of the average weight.

* * * * *